Patented Oct. 6, 1953

2,654,778

UNITED STATES PATENT OFFICE 2,654,778

DERIVATIVES OF CYCLOALKYLBENZOYL-ARALKANOIC ACIDS

Robert R. Burtner, Skokie, Ill., assignor to G. D. Searle & Co., Chicago, Ill., a corporation of Illinois No Drawing. Application May 26, 1950, Serial No. 164,626

18 Claims. (Cl. 260—520)

This invention relates to substituted cycloalkylbenzoylaliphatic acids, to salts and esters thereof, and to methods for the production of such compounds. In particular, this invention is concerned with compounds of the general structural formula

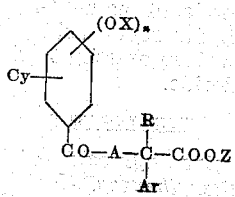

wherein Cy is a cycloalkyl radical, X and R are hydrogen or a lower alkyl group, Ar is an aryl radical, A is a bivalent aliphatic hydrocarbon radical, $n$ is an integer smaller than 3 and Z is a member of the group consisting of hydrogen or one equivalent of a cation, an alkyl, and basically substituted alkyl groups.

In the foregoing structural formula, Cy represents alicyclic radicals such as cyclobutyl, cyclopentyl, cyclohexyl, cycloheptyl, as well as alkyl derivatives of such radicals. X and R represent hydrogen or lower alkyl radicals such as methyl, ethyl, propyl, isopropyl, butyl, isobutyl, tertiary butyl and the like. Ar represents such aryl groups as phenyl, tolyl, anisyl, naphthyl and the like. The bivalent aliphatic hydrocarbon radical represented by A contains one to four carbon atoms and may be straight or branch chained. Such groups as methylene, ethylene, propylene, butylene, dimethylene, trimethylene, tetramethylene, vinylene and allylene are within the scope of this invention. Among the groups which Z may represent are one equivalent of a cation, including hydrogen, alkali metal ions, alkaline earth metal ions, ammonium and amine ions. Included in the scope of the invention also are esters in which Z represents such organic radicals as lower alkyl groups, and basically substituted alkyl groups of the general type

—B—NR'R''

Wherein B is a bivalent aliphatic hydrocarbon radical as defined above. In such esters the groups R' and R'' may represent hydrogen and such lower alkyl groups as methyl, ethyl, propyl, butyl, amyl, hexyl and cyclohexyl, wherein the propyl, butyl, amyl and hexyl groups may be either of the straight chain or branched chain type. The radical NR'R'' may also be a part of a nitrogen containing heterocyclic group such as an N-piperidino, N-lupetidino, N-pyrrolidino or N-morpholino group.

The basic esters of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, dimethyl sulfate, diethyl sulfate, methyl benzenesulfonate, ethyl toluenesulfonate, ethylene chlorohydrin, propylene bromohydrin, allyl bromide.

It is the object of this invention to provide novel chemical substances of the foregoing type. It is a further object of this invention to provide simple and economical methods of producing such substances. It is still another object to provide feasible synthetic methods for the foregoing substances from readily available starting materials. The compounds of this invention are useful as therapeutic agents. Certain of them are effective in producing choleresis. Others are useful as parasiticides. Certain of the esters and their salts are also active spasmolytic agents.

The acids of this invention, i. e. compounds of the general structural formula shown above, in which Z represents H, are prepared by reacting a cycloalkylphenyl alkyl ether of the type

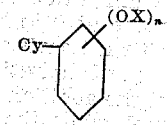

with a dibasic anhydride or halide derived from a dibasic acid of the following formula

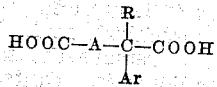

with a Friedel-Crafts type catalyst, generally in an inert organic solvent. Among such catalysts are anhydrous aluminum chloride, anhydrous ferric chloride, stannic chloride, boron trifluoride, zinc chloride, hydrogen fluoride, sodium aluminum chloride and similar substances. The inert solvents are organic liquids having chemical reactivities lower than that of the foregoing ether and include nitrobenzene, carbon disulfide, chlorobenzene, tetrachloroethane, and related substances.

Salts of the acids which comprise this invention may be prepared in certain cases by solution of the acid in an alkaline solution, such as of potassium hydroxide or sodium carbonate, followed by salting out by a salt, such as sodium chloride. In other cases it is advantageous to treat an alcoholic solution of the acid with an alcoholic solution of the base, the salts formed being frequently insoluble in alcohol. Precipitation may further be induced by addition of another solvent such as ether or benzene.

Salts of ammonia or of a lower alkyl, dialkyl, or trialkylamine or corresponding alkanol amine may be obtained by treating a solution of the acid in an organic solvent with a solution of the amine in a similar solvent and precipitating the desired salt with another miscible solvent in which the salt is insoluble.

The acids may be esterified by conventional methods. For instance, a solution of the acid in an anhydrous organic solvent, such as a lower aliphatic alcohol, may be heated with an excess of an aminoalkyl halide of the type halogen —B—NR'R'' in a similar anhydrous organic solvent miscible in the first. The hydrohalide of the ester thus formed may be converted to the free basic ester by treatment with alkali either in the original solvent or by distilling off the latter and taking up the salt in a new solvent such as water and rendering the same alkaline. The basic esters thus obtained may then be converted into other salts of inorganic and strong organic acids or into quaternary ammonium salts as indicated above.

My invention is disclosed in further detail by the following characteristic examples. These are intended merely to illustrate the invention and are not to be construed as limiting the invention in spirit or in scope. It will be apparent to chemists skilled in the art that many modifications may be made with regard to reagents and conditions without departing from the scope of the invention. In these examples, temperatures are given in degrees centigrade, relative amounts of materials in parts by weight and pressures for vacuum distillations in millimeters (mm.) of 5 mercury.

EXAMPLE 1

*Beta-(2-methoxy-5-cyclohexylbenzoyl) hydratropic acid*

125.4 parts of p-cyclohexylanisole and 56 parts of phenylsuccinic anhydride suspended in 395 parts of nitrobenzene at 0 to 3° C. are reacted over 30 minutes with 112 parts of anhydrous aluminum chloride, good agitation being maintained throughout the addition. Stirring is continued for 12 hours, while the ice bath is permitted to warm up to room temperature. The reaction mixture is allowed to stand at room temperature for 48 hours and is then quenched with ice and hydrochloric acid. The mixture is steam distilled to remove the solvent, the hot aqueous mother liquor is decanted and the very viscous residue chilled. This crude product is taken up in 2000 parts of water containing 30 g. of potassium hydroxide at about 65° C. Solution is essentially complete. After chilling, the solution is washed with ether and residual ether is removed with steam. Cooling and acidification causes separation of a crude mixture of acids, which is collected on a filter, triturated with water, rinsed on a filter and dried. A strong ferric chloride test indicates that a considerable degree of methoxyl cleavage occurs in the process. Remethylation is accomplished by treatment with an excess of dimethyl sulfate in sodium hydroxide solution. The resultant waxy crude acid fails to give a color in the ferric chloride test. It is refluxed with 550 parts of cyclohexane, cooled to 20° C., filtered and rinsed with a small amount of cyclohexane. The resultant beta-(2-methoxy-5-cyclohexylbenzoyl)- hydratropic acid is recrystallized from 600 parts of methanol using charcoal as a clarifying agent. The pure acid melts at about 174° C.

EXAMPLE 2

*Beta - (2-hydroxy-5-cyclohexylbenzoyl) hydratropic acid*

A mixture of 10 parts of beta-(2-methoxy-5-cyclohexylbenzoyl) hydratropic acid in 120 parts of hydriodic acid (specific gravity 1.7) and 27 parts of acetic anhydride is refluxed for 25 minutes, by which time the evolution of methyl iodide has ceased. The resulting solution is poured into ice water. The somewhat tacky brown solid is collected on a filter, rinsed with water and then triturated with water. The crude acid is collected on a filter and then taken up in 300 parts of a 1% sodium hydroxide solution. This solution is freed from neutral impurities by extraction with ether. Residual ether is removed by steam distillation. After cooling the solution is acidified. The white amorphous, crude acid is crystallized twice from methanol using charcoal as a clarifying agent. The pure crystals of beta-(2-hydroxy-5-cyclohexylbenzoyl) hydratropic acid melt at about 165–166° C. A deep amethyst color is obtained with ferric chloride.

EXAMPLE 3

*Beta-diethylaminoethyl ester of beta-(2-methoxy-5-cyclohexylbenzoyl)-hydratropic acid*

A solution of 165 parts of beta-(2-methoxy-5-cyclohexylbenzoyl)-hydratropic acid and 67.7 parts of diethylaminoethyl chloride in 900 parts of isopropanol is heated at reflux temperature for 5 hours. The solution is then cooled, a small amount of dimer removed by filtration and the solvent distilled off under vacuum. The crude ester hydrochloride is dissolved in water and the basic ester precipitated by addition of an excess of a 10% sodium hydroxide solution. The oily product is extracted with ether, the ether extract washed with water and dried over sodium sulfate. Removal of the ether leaves the beta-diethylaminoethyl ester of beta-(2-methoxy-5-cyclohexylbenzoly) hydratropic acid as a viscous oil. The latter is dissolved in 2100 parts of absolute ether and one equivalent of hydrogen chloride in absolute alcohol is added. The viscous hydrochloride becomes crystalline on standing. It is triturated with ether, filtered and dried to yield a white, amorphous powder which melts at about 115° C. This hydrochloride is very soluble in most common solvents.

EXAMPLE 4

*Alpha - phenyl-gamma-(2,4-dimethoxy-5-cyclopentylbenzoyl) butyric acid*

Cyclopentene and m-dimethoxybenzene in the presence of boron trifluoride yield 2,4-dimethoxyphenylcyclopentane which distils at 95 to 96° C. at 0.25 mm., ($n_D^{25}=1.5368$). 256 parts of 2,4-dimethoxyphenylcyclopentane and 247 parts of alpha-phenylglutaric anhydride are reacted over 30 minutes with 348 parts of anhydrous aluminum chloride at 0–3° C., good agitation being maintained throughout the addition. With continued stirring the temperature is maintained at 0° C. for one hour longer and then at room temperature for 15 additional hours. After standing for 24 hours, the reaction mixture is quenched with ice and hydrochloric acid to decompose the soluble aluminum chloride addition complex and then steam distilled to remove the solvent. The crude product is worked up in the same manner as indicated in Example 1. Ferric chloride tests indicate that considerable demethylation occurs, which can partially be avoided by operating at relatively lower temperatures. Remethylation is accomplished by treatment with an excess of dimethyl sulfate in sodium hydroxide solution. The resultant alpha-phenyl-gamma-(2,4-dimethoxy-5-cyclopentylbenzoyl)butyric acid no longer gives a ferric chloride test. It may be obtained in the form of colorless needles by recrystallization from a large volume of methanol, using charcoal as a clarifying agent.

Treatment of this compound with hydriodic acid and acetic anhydride under the conditions of Example 2 leads to methoxyl cleavage both in the 2 and 4 positions.

EXAMPLE 5

*Gamma-piperidinopropyl ester of alpha-phenyl-gamma - (2,4 - dimethyoxy - 5 - cyclopentylbenzoyl)butyric acid*

A solution of 386 parts of alpha-phenyl-gamma-(2,4 - dimethoxy - 5 - cyclopentylbenzoyl)butyric acid and 180 parts of N-gamma-chloropropyl-piperidine in anhydrous isopropanol is refluxed for 8 hours. The solution is cooled, filtered and the solvent removed from the filtrate by distillation under vacuum. The crude ester hydrochloride is dissolved in water and the free basic gamma-piperidinopropyl ester of alpha-phenyl-gamma - (2,4 - dimethoxy - 5 - cyclopentyl-benzoyl)butyric acid precipitated by addition of an excess of sodium hydroxide solution. The oily base is extracted with ether, the ether extract washed with water and dried over sodium sulfate. The ether is then removed by distillation and the free base obtained as a clear, viscous oil. It may be reconverted into the hydrochloride by solution in a large volume of absolute ether and slow addition of one equivalent of a 25% solution of hydrogen chloride in anhydrous isopropanol. A colorless powder precipitates which is soluble in water and in most common solvents.

I claim:

1. A compound of the structural formula

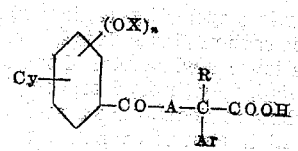

wherein Cy is a cycloalkyl radical containing five to six cyclic carbon atoms, Ar is a lower aryl radical of the class consisting of phenyl, tolyl, anisyl and naphthyl, X and R are members of the class consisting of hydrogen and lower alkyl radicals, A is a lower alkylene radical, and $n$ is an integer smaller than 3.

2. A compound of the structural formula

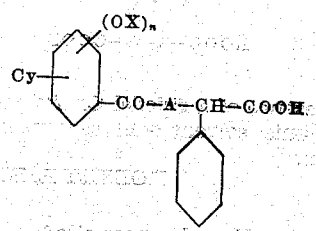

wherein Cy is a cycloalkyl radical containing five to six cyclic carbon atoms, X is a lower alkyl radical, A is a lower alkylene radical, and $n$ is an integer smaller than 3.

3. A compound of the structural formula

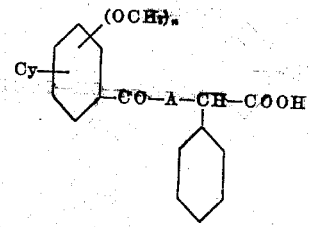

wherein Cy is a cycloalkyl group containing five to six cyclic carbon atoms, A is a lower alkylene radical, and $n$ is an integer smaller than 3.

4. A compound of the structural formula

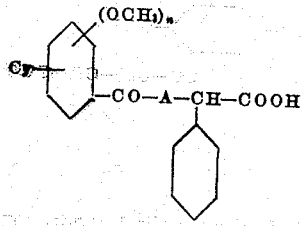

wherein Cy is a cycloalkyl group containing five to six cyclic carbon atoms, A is a methylene group, and $n$ is an integer smaller than 3.

5. A compound of the structural formula

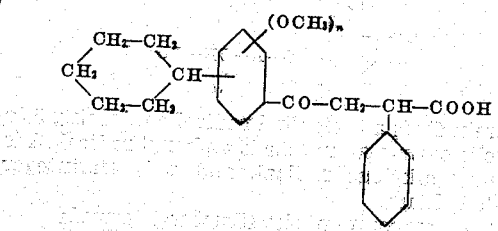

wherein $n$ is an integer smaller than 3.

6. A compound of the structural formula

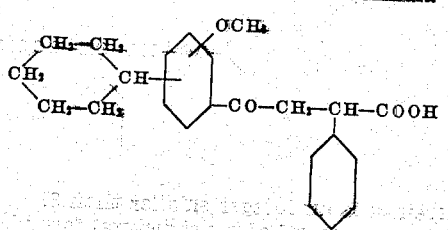

7. A compound of the structural formula

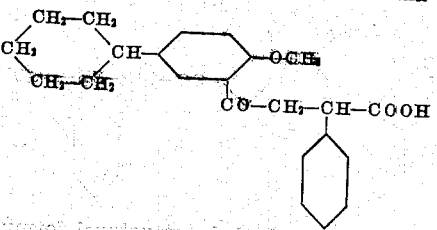

8. A compound of the structural formula

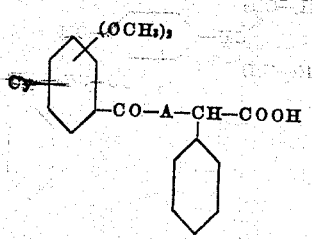

wherein Cy is a cycloalkyl group containing five to six carbon atoms, and A is a methylene group.

9. A compound of the structural formula

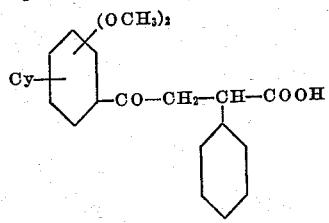

wherein Cy is a cycloalkyl group containing five to six cyclic carbon atoms.

10. A compound of the structural formula

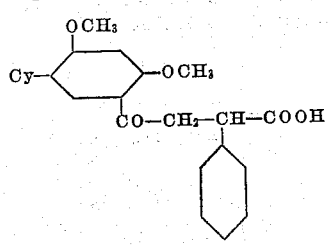

wherein Cy is a cycloalkyl group containing five to six cyclic carbon atoms.

11. A compound of the structural formula

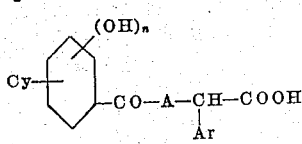

wherein Cy is a cycloalkyl radical containing 5 to 6 cyclic carbon atoms, Ar is a phenyl radical, A is a lower alkylene radical, and $n$ is an integer smaller than 3.

12. A compound of the structural formula

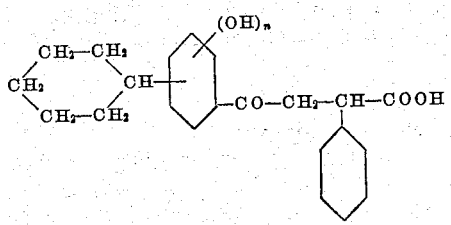

wherein $n$ is an integer smaller than 3.

13. A compound of the structural formula

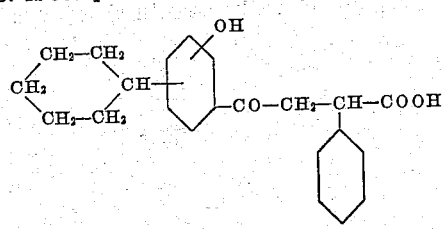

14. A compound of the structural formula

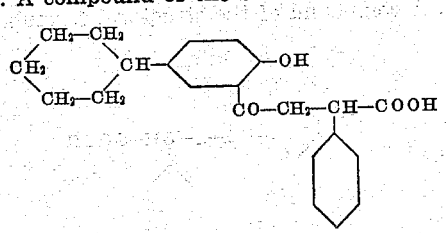

15. A compound of the structural formula

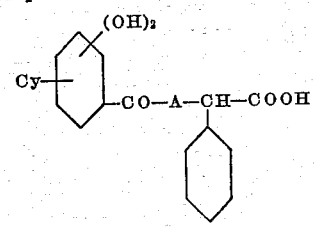

wherein Cy is a cycloalkyl group containing five to six carbon atoms, and A is a methylene group.

16. A compound of the structural formula

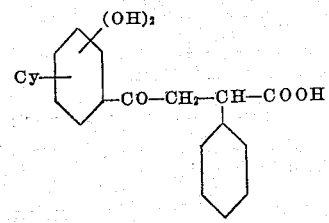

wherein Cy is a cycloalkyl group containing five to six cyclic carbon atoms.

17. A compound of the structural formula

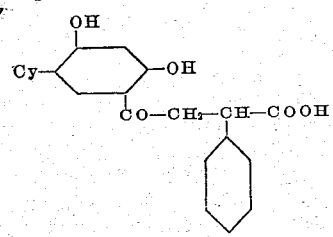

wherein Cy is a cycloalkyl group containing five to six cyclic carbon atoms.

18. The process of producing a compound of the structural formula

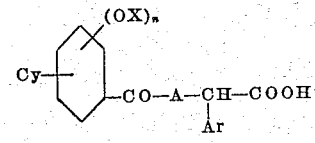

wherein Cy is a cycloalkyl radical containing five to six cyclic carbon atoms, X is a lower alkyl radical, Ar is a lower aryl radical of the class consisting of phenyl, tolyl, anisyl and naphthyl, A is a lower alkylene radical, and $n$ is an integer smaller than 3, which comprises heating a cycloalkylphenyl alkyl ether of the structural formula

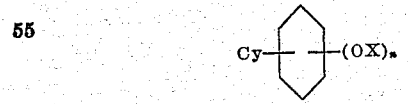

with a member of the class consisting of acid anhydrides and acid halides derived from a dibasic acid of the formula

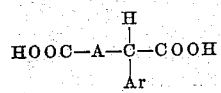

in the presence of a Friedel-Crafts catalyst in an inert organic solvent and separating the acid therefrom.

ROBERT R. BURTNER.

No references cited.